US011713800B2

(12) United States Patent
Reid et al.

(10) Patent No.: US 11,713,800 B2
(45) Date of Patent: Aug. 1, 2023

(54) METHOD OF MANUFACTURING BOLTLESS UNITARY RING GEAR-FLANGE BODY

(71) Applicant: NPC Robotics Corporation, Mound, MN (US)

(72) Inventors: Richard Reid, Eden Prairie, MN (US); John David, Chaska, MN (US); Paul Dickie, Elko New Market, MN (US)

(73) Assignee: NPC Robotics Corporation, Mound, MN (US)

( * ) Notice: Subject to any disclaimer, the term of this patent is extended or adjusted under 35 U.S.C. 154(b) by 0 days.

(21) Appl. No.: 17/652,574

(22) Filed: Feb. 25, 2022

(65) Prior Publication Data

US 2022/0275857 A1    Sep. 1, 2022

Related U.S. Application Data

(63) Continuation-in-part of application No. 29/772,183, filed on Feb. 26, 2021, now Pat. No. Des. 982,629.
(Continued)

(51) Int. Cl.
*B23P 15/14*     (2006.01)
*F16H 55/17*     (2006.01)
(Continued)

(52) U.S. Cl.
CPC .............. *F16H 55/17* (2013.01); *B21D 22/14* (2013.01); *B21D 53/28* (2013.01); *B23K 20/12* (2013.01);
(Continued)

(58) Field of Classification Search
CPC ...................................................... B23P 15/14
See application file for complete search history.

(56) References Cited

U.S. PATENT DOCUMENTS 3,517,975 A    6/1970  Lonngren et al.
4,030,787 A    6/1977  Brogan et al.
(Continued)

FOREIGN PATENT DOCUMENTS

CN    210180147 U    3/2020
EP    1719572 A2    11/2006

OTHER PUBLICATIONS

East Coast Gears, "East Coast Gears—Examples and Range of Work," Archive.org, Oct. 16, 2016, retrieved from the Internet Nov. 17, 2021, https://web.archive.org/web/20161016045207/http://www.eastcoastgears.co.za/gear-manufacturer.asp.
(Continued)

*Primary Examiner* — Sarang Afzali
(74) *Attorney, Agent, or Firm* — Craige Thompson; Thompson Patent Law; Timothy D. Snowden (57) ABSTRACT

Apparatus and associated methods relate to a unitary ring gear-flange body (URGFB). In an illustrative example, the flange body may be spin-formed and may, for example, include a riser body extending substantially parallel to a longitudinal axis and a flange extending substantially radially outward from the riser body. To the riser body may, for example, be welded a ring gear to form a unitary assembly, the ring gear having an axis of revolution aligned with the longitudinal axis. A continuous coating may, for example, be applied to at least a selected portion of a surface of the unitary assembly. Various embodiments may advantageously provide a cost-efficient, weight-efficient, and/or time-efficient unitary body which may, for example, be coupled to machinery to provide a shaftless torque-transmitter.

21 Claims, 11 Drawing Sheets

Related U.S. Application Data (60) Provisional application No. 63/154,540, filed on Feb. 26, 2021.

(51) Int. Cl.
  *B21D 53/28* (2006.01)
  *B21D 22/14* (2006.01)
  *C23C 30/00* (2006.01)
  *B23K 20/12* (2006.01)
  *B23K 101/00* (2006.01)

(52) U.S. Cl.
  CPC ............ *B23P 15/14* (2013.01); *C23C 30/005* (2013.01); *B23K 2101/008* (2018.08); *F16H 2055/176* (2013.01); *Y10T 29/49462* (2015.01)

(56) References Cited

U.S. PATENT DOCUMENTS

| | | | |
|---|---|---|---|
| D262,033 S | 11/1981 | Totsu | |
| 5,716,300 A | 2/1998 | Sammataro et al. | |
| 5,820,270 A | 10/1998 | Richardson | |
| 8,443,710 B2 | 5/2013 | Domholt et al. | |
| 8,747,271 B2 | 6/2014 | Vallejo | |
| 8,920,279 B2 | 12/2014 | Roscoe | |
| 9,482,308 B2 * | 11/2016 | McCombs | F16D 13/72 |
| 9,518,645 B2 * | 12/2016 | McCombs | B21D 22/14 |
| 9,733,037 B2 | 8/2017 | Domholt et al. | |
| 9,759,289 B2 | 9/2017 | Chung et al. | |
| 9,759,506 B2 | 9/2017 | Domholt et al. | |
| 9,764,592 B1 | 9/2017 | Hays et al. | |
| 10,213,874 B2 | 2/2019 | Uchida et al. | |
| 10,281,238 B2 | 5/2019 | Domholt et al. | |
| 10,330,422 B2 | 6/2019 | Domholt et al. | |
| 10,495,210 B2 * | 12/2019 | Hasan | F03D 15/00 |
| 10,775,124 B2 | 9/2020 | Domholt et al. | |
| 10,781,797 B2 * | 9/2020 | Sørensen | F16C 25/04 |
| 2010/0001044 A1 * | 1/2010 | Weibling | B23K 33/004 228/164 |
| 2014/0141922 A1 | 5/2014 | Biermann et al. | |
| 2018/0058545 A1 | 3/2018 | Ligata | |
| 2018/0117960 A1 | 5/2018 | Hays et al. | |
| 2019/0136962 A1 | 5/2019 | Hasan et al. | |
| 2019/0176418 A1 | 6/2019 | Richter et al. | |
| 2020/0025502 A1 | 1/2020 | Domholt et al. | |
| 2021/0031253 A1 | 2/2021 | Baer et al. | |

OTHER PUBLICATIONS

Ganga Technocast, "Cast Iron,Ductile Iron Casting Plain Gear Wheel," indiamart.com, retreieved from the internet Nov. 17, 2021, https://www.indiamart.com/proddetail/plain-gear-wheel-10715586591.html.

Luoyang Hongxin, "Carbon Alloy Steel DIN 2543 Forging Welding Flange Ring teeth gear," steel-gears.com, retrieved from the internet Nov. 17, 2021, http://www.steel-gears.com/sale-13088171-carbon-alloy-steel-din-2543-forging-welding-flange-ring-teeth-gear.html.

Northern Tool, "Brave Pro Gas-Powered Steel Drum Concrete Mixer—7 Cu. Ft., Model# BRPCM107H," Northern Tool + Equipment., retreieved from the internet Feb. 18, 2021, https://www.northerntool.com/shop/tools/product_200860341_200860341.

Light Single Row Ball Slewing Bearing, available in m.made-in-china.com/, announced Year 2008 [online], [site visited Aug. 22, 2022], Internet URL: https://m .made-in-china .com/product/.

* cited by examiner

METHOD OF MANUFACTURING BOLTLESS UNITARY RING GEAR-FLANGE BODY

CROSS-REFERENCE TO RELATED APPLICATIONS

This application claims the benefit of U.S. Provisional Application Ser. No. 63/154,540, titled "Boltless Unitary Ring Gear-Flange Body," filed by Richard Reid, et al., on Feb. 26, 2021.

This application is a Continuation-in-Part of and claims the benefit of U.S. application Ser. No. 29/772,183, titled "Boltless Unitary Ring Gear-Flange Body," filed by Richard Reid, et al., on Feb. 26, 2021.

This application incorporates the entire contents of the foregoing application(s) herein by reference.

This application is related to the subject matter of:

U.S. application Ser. No. 12/751,254, titled "BATTERY-POWERED MOTOR UNIT," filed by Norman L. Domholt, et al., on Mar. 31, 2010, and issued as U.S. Pat. No. 8,443,710 on May 21, 2013;

U.S. application Ser. No. 13/895,787, titled "BATTERY-POWERED MOTOR UNIT," filed by Norman L. Domholt, et al., on May 16, 2013, and issued as U.S. Pat. No. 9,759,506 on Sep. 12, 2017;

U.S. application Ser. No. 14/722,819, titled "BATTERY-POWERED MOTOR UNIT," filed by Norman L. Domholt, et al., on May 27, 2015, and issued as U.S. Pat. No. 9,733,037 on Aug. 15, 2017;

U.S. application Ser. No. 15/055,384, titled "Cartridge Based Modular Turret Control System," filed by Norman L. Domholt, et al., on Feb. 26, 2016, and issued as U.S. patent Ser. No. 10/281,238 on May 7, 2019;

U.S. application Ser. No. 15/704,910, titled "Cartridge Based Modular Turret Control System," filed by Norman L. Domholt, et al., on Sep. 14, 2017, and issued as U.S. patent Ser. No. 10/330,422 on Jun. 25, 2019;

U.S. application Ser. No. 16/226,264, titled "Motor-Less Cartridge Ring Gear Engagement Module for Actuating Rotation of a Turret," filed by Norman L. Domholt, et al., on Dec. 19, 2018, and issued as U.S. patent Ser. No. 10/775,124 on Sep. 15, 2020; and, U.S. application Ser. No. 16/993,421, titled "Motor-Less Cartridge Ring Gear Engagement Module for Actuating Rotation of a Turret," filed by Norman L. Domholt, et al., on Aug. 14, 2020 now abandonded.

This application incorporates the entire contents of the foregoing application(s) herein by reference.

TECHNICAL FIELD

Various embodiments relate generally to mechanical drive members.

BACKGROUND

Humankind creates and applies various systems to perform works. Systems may, for example, include machinery. Machinery may include, for example, a motive power. Motive power may, for example, include engines and/or motors. Machinery may, for example, include power transmission. Power transmission may, by way of example and not limitation, include belts, gears, and/or cams configured to transfer power from a motive power source to an output.

Gears may, for example, be configured to apply a moment to a drive member to transmit torque. A drive member may, for example, include a drive shaft. The drive shaft may, for example, be coupled to a power transmitter (e.g., gear, pinion) and/or consumer.

Gears may, for example, be machined. Gears may, for example, be forged. Gears may, for example, be cast. Some gears may, for example, be heat-treated (e.g., annealed, hardened). Some gears may, for example, be cryo-treated.

Gears may be formed in various configurations. For example, some gears may be external (e.g., teeth formed on an outside surface). Some gears may, for example, be internal. Some gears may, by way of example and not limitation, be configured as spur gears. Various gears may, for example, be configured as helical gears. Some gears may, for example, include bevel gears. For example, hypoid gears may be a type of spiral bevel gears. In some implementations, gear teeth may, for example, be formed with an involute profile.

SUMMARY

Apparatus and associated methods relate to a unitary ring gear-flange body (URGFB). In an illustrative example, the flange body may be spin-formed and may, for example, include a riser body extending substantially parallel to a longitudinal axis and a flange extending substantially radially outward from the riser body. To the riser body may, for example, be welded a ring gear to form a unitary assembly, the ring gear having an axis of revolution aligned with the longitudinal axis. A continuous coating may, for example, be applied to at least a selected portion of a surface of the unitary assembly. Various embodiments may advantageously provide a cost-efficient, weight-efficient, and/or time-efficient unitary body which may, for example, be coupled to machinery to provide a shaftless torque-transmitter.

Various embodiments may achieve one or more advantages. For example, some embodiments may advantageously provide for torque-transmission without requiring an intermediary shaft between an annular torque-transmitter and a power source and/or a driven body. Various embodiments may, for example, advantageously decrease manufacturing and/or assembly time and/or costs by allowing a single unitary body to be manufactured instead of assembly of an annular torque-transmitter and a surface mount. Various embodiments may, for example, advantageously provide for manufacturing the unitary body without the need for individual hardware components coupling the annular torque-transmitter and the surface mount. Various embodiments may, for example, advantageously reduce weight of a surface-mounted annular torque-transmission apparatus by eliminating mounting structures (e.g., a flange for mounting a ring gear to a separate, non-unitary surface mount), coupling components, or some combination thereof.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, a unitary annular torque-transmitter-surface mount body configured as a boltless unitary ring gear-flange body (URGFB) is introduced with reference to FIG. 1 in the context of an exemplary manufacturing method. Second, that introduction leads into a description with reference to FIGS. 2-6 of some exemplary embodiments of a URGFB. Third, with reference to FIGS. 7A-8, exemplary assembly processes to form a unitary body are described. Finally, the document discusses further embodiments, exemplary applications and aspects relating to URGFB s.

Figure 1:
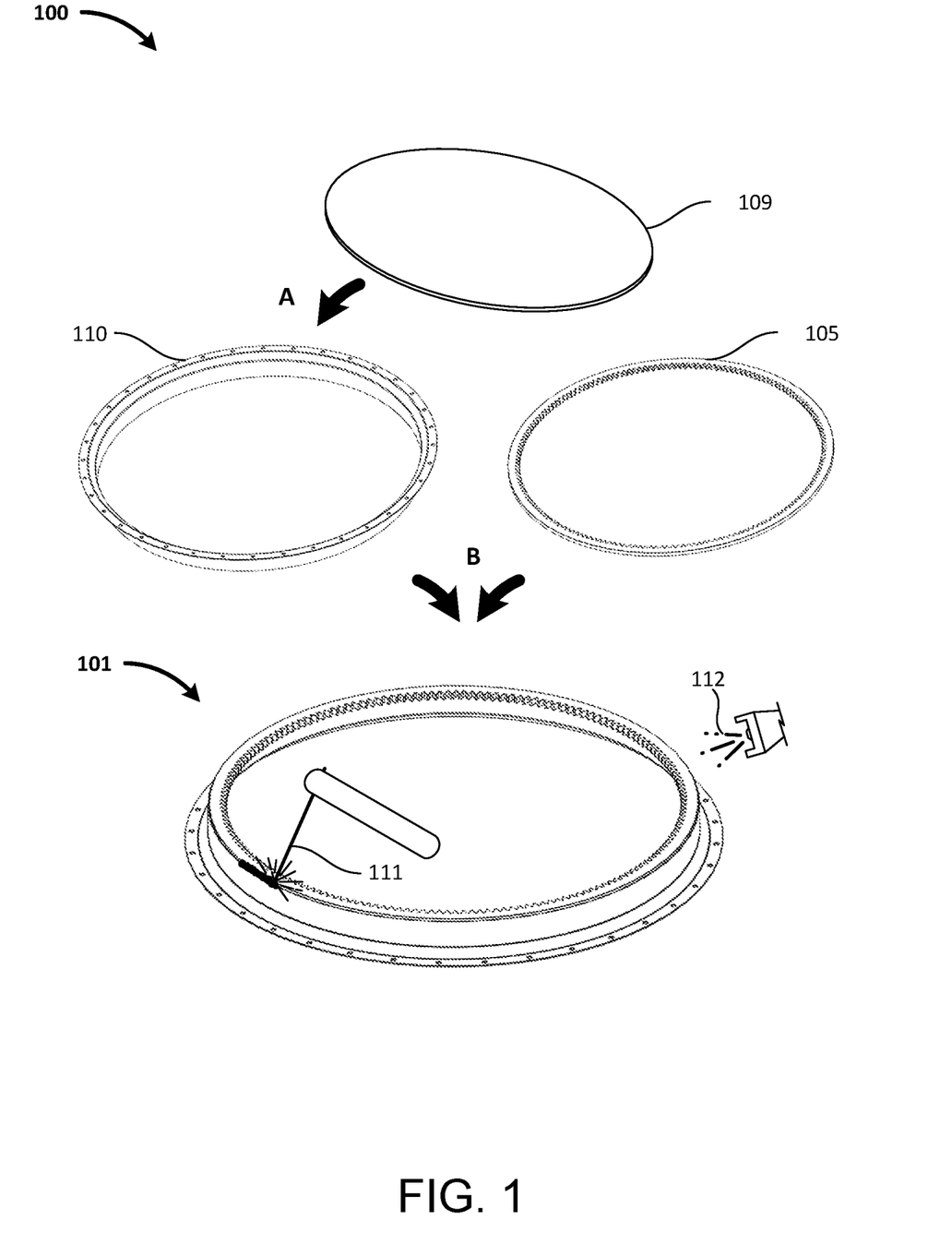
FIG. 1 depicts an exemplary unitary torque transmitter-surface mount body (UTTSMB) configured as a boltless unitary ring gear-flange body (URGFB) in the context of an exemplary manufacturing method.

FIG. 1 depicts an exemplary unitary torque transmitter-surface mount body (UTTSMB) configured as a boltless unitary ring gear-flange body (URGFB) in the context of an exemplary manufacturing method. In an illustrative depicted scenario 100, a URGFB 101 is formed as a unitary body from a ring gear 105 and a flange 110. As depicted, a material blank 109 (e.g., a steel sheet) is formed (e.g., spin-formed) (operation "A") into the flange 110. The ring gear 105 and the flange 110 are assembled (operation "B"). The assembled ring gear 105 and flange 110 are formed into a unitary assembly by one or more operations. In the depicted example, the ring gear 105 and the flange 110 are welded 111 together. The resulting URGFB 101 is then coated 112. Accordingly, a unitary annular torque-transmitter-surface mount body may be formed. The URGFB 101 may, for example, be assembled to machinery, such as by the flange 110. As an illustrative example, the machinery may include a military armored vehicle (e.g., a 'tank'). The machinery may, for example, include a robot.

The unitary body (URGFB 101) may, for example, advantageously reduce weight of a final assembly (e.g., versus machining and/or casting the flange 110, versus bolting the flange 110 to the ring gear 105). Accordingly, the URGFB 101 may, by way of example and not limitation, advantageously reduce transport costs (e.g., of components for the machinery, of the final machinery).

The URGFB 101 may, for example, advantageously reduce cost of manufacturing. For example, spin-forming may be lower cost than machining and/or casting the flange 110. The URGFB 101 may, for example, advantageously reduce assembly time (e.g., reducing labor cost), such as by reducing or eliminating bolting of the ring gear 105 to the flange 110. The URGFB 101 may, for example, advantageously reduce coating time by allowing the URGFB 101 to be coated (e.g., in a single operation) as a unitary body instead of coating individual parts (e.g., before assembly with fasteners).

The URGFB 101 may, for example, increase longevity. For example, eliminating bolts joining the ring gear 105 to the flange 110 may reduce crevices in the URGFB 101 and so, for example, may advantageously reduce opportunity for and/or risk of crevice corrosion. For example, the coating may advantageously form a (substantially) continuous coating over an entire external surface (e.g., exposed surface) of the URGFB 101.

Figure 2:
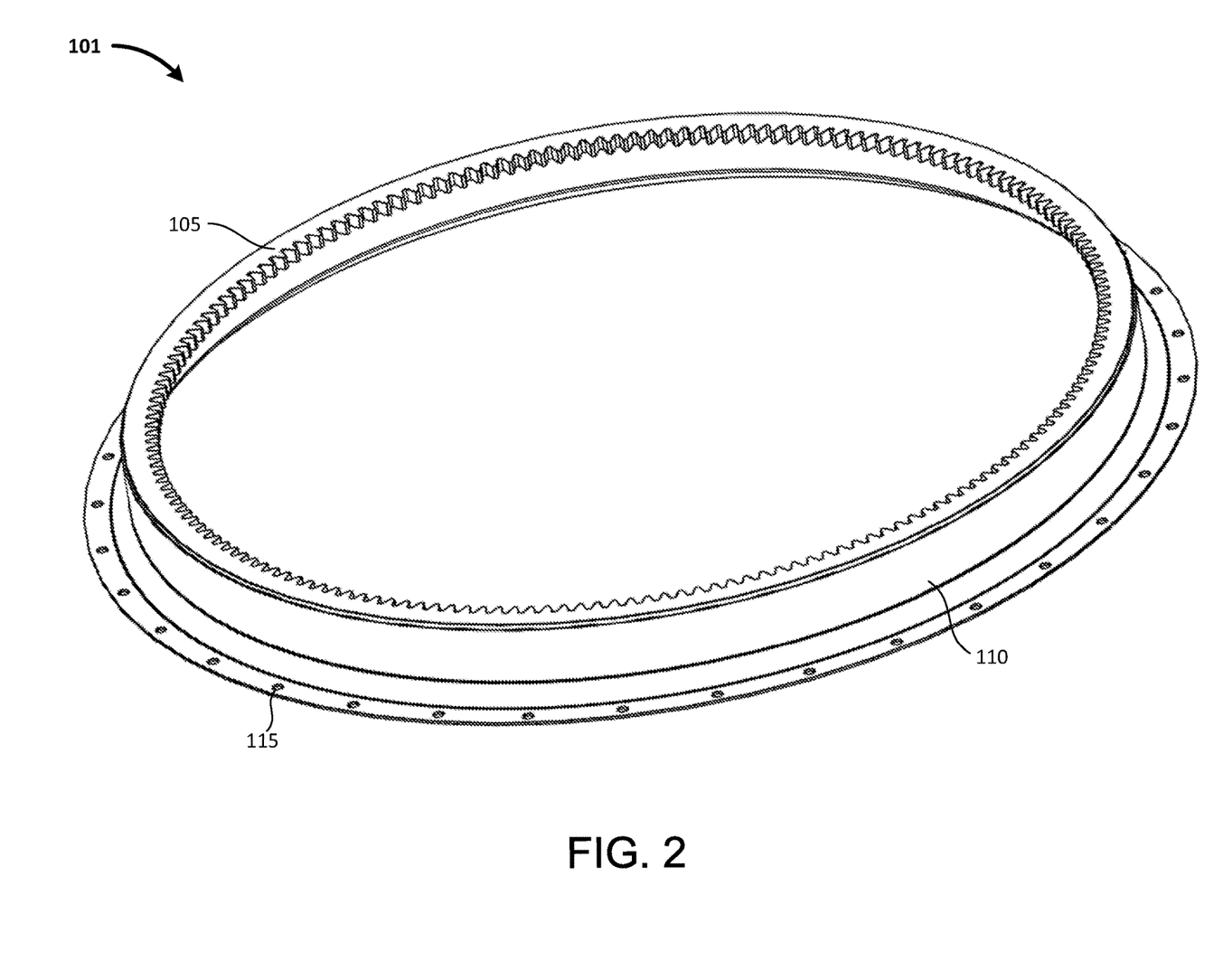
FIG. 2 depicts a top perspective view of an exemplary URGFB.
Figure 3:
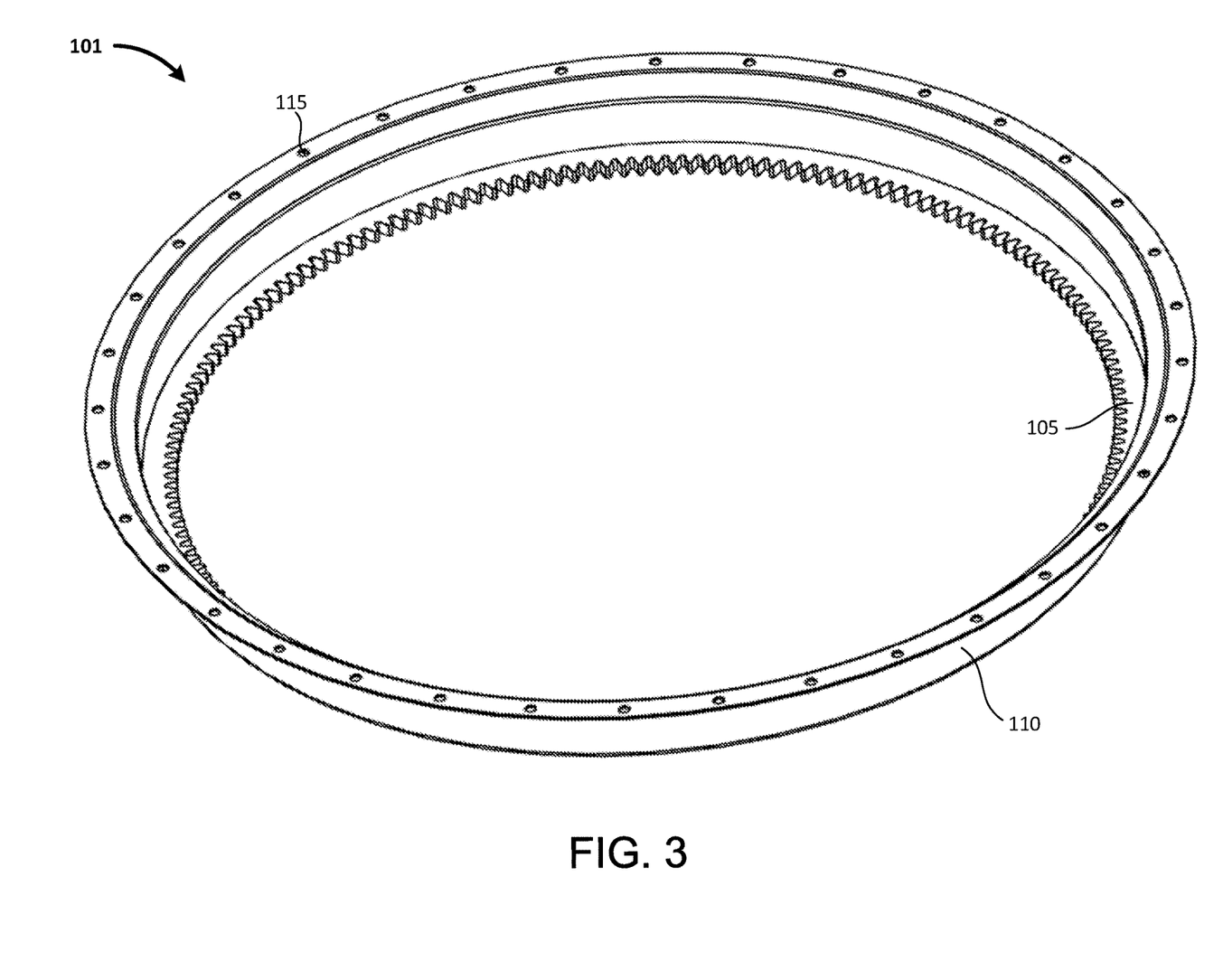
FIG. 3 depicts a bottom perspective view of the URGFB of FIG. 2.
Figure 4:
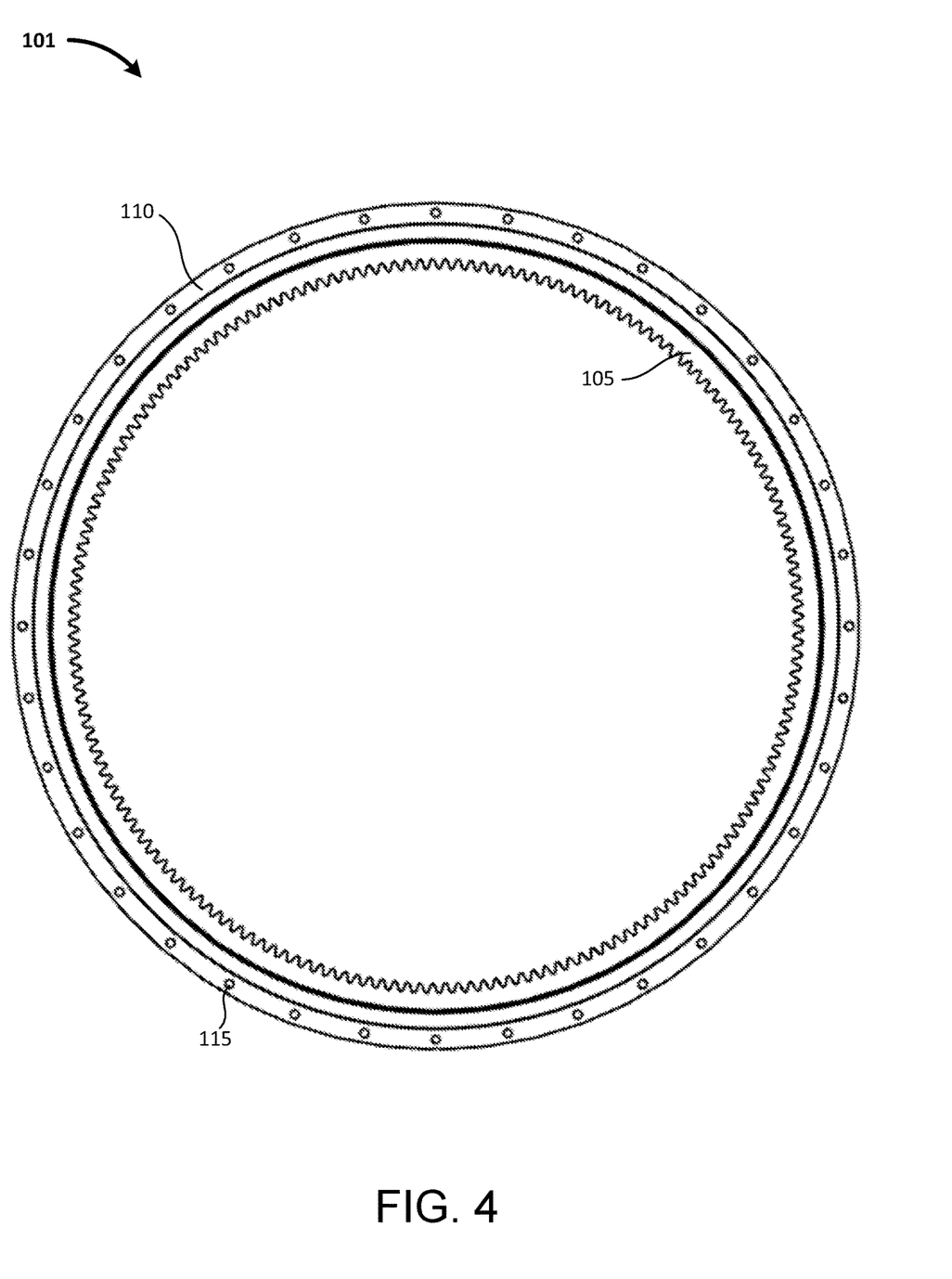
FIG. 4 depicts a top plan view of the URGFB of FIG. 2.
Figure 5:
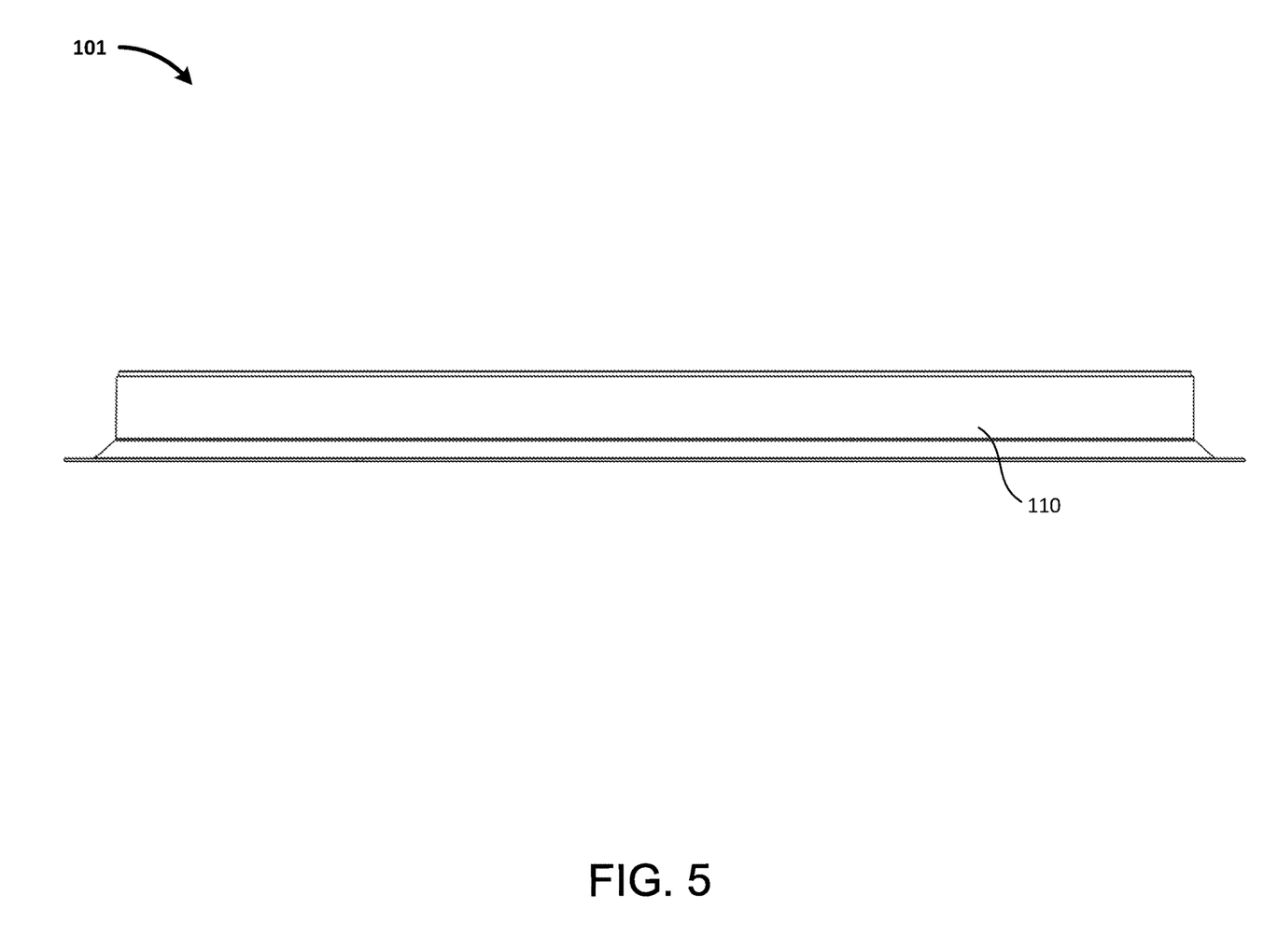
FIG. 5 depicts a side elevation view of the URGFB of FIG. 2.
Figure 6:
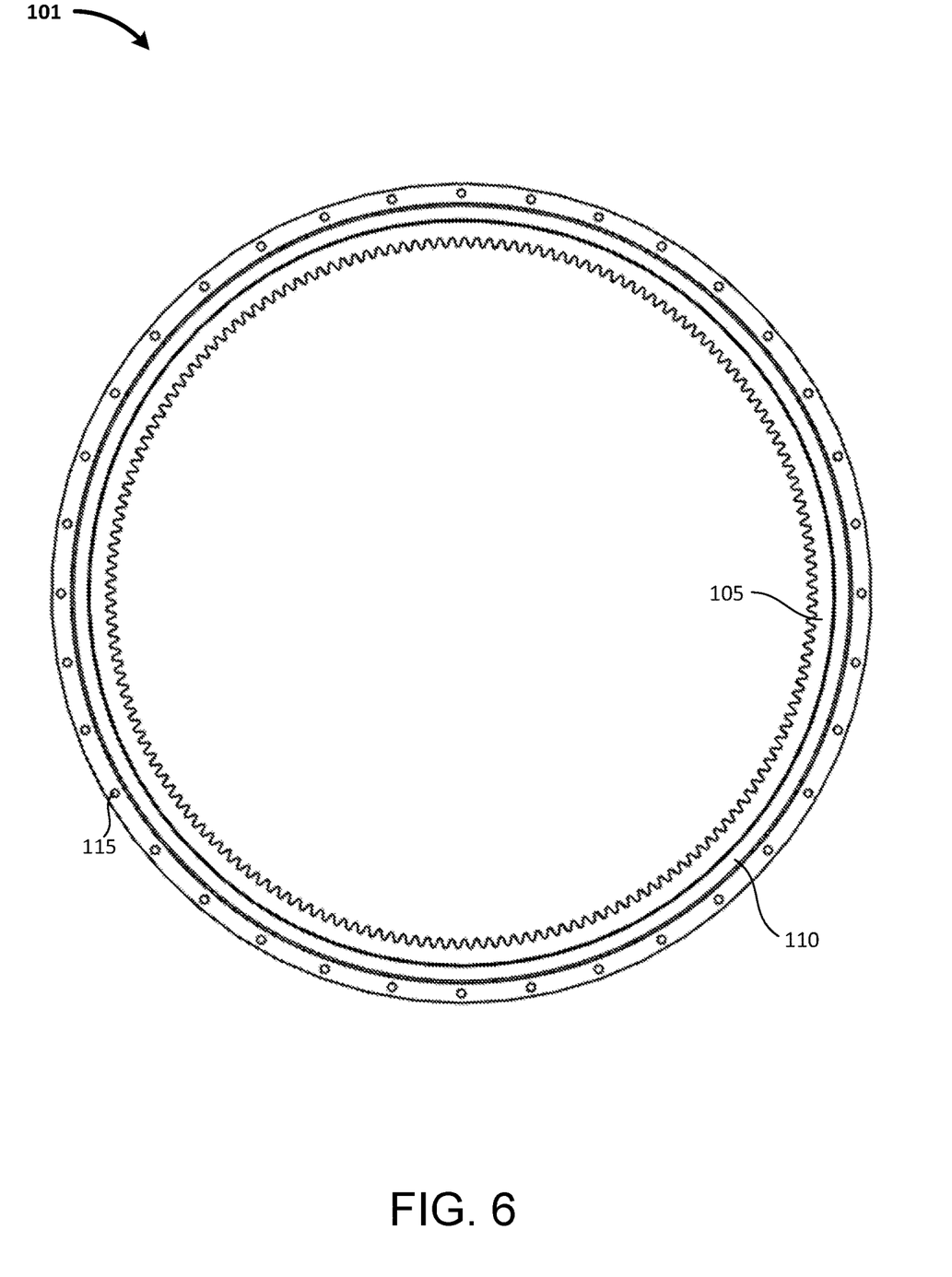
FIG. 6 depicts a bottom plan view of the URGFB of FIG. 2.

FIG. 2 depicts a top perspective view of an exemplary URGFB. FIG. 3 depicts a bottom perspective view of the URGFB of FIG. 2. FIG. 4 depicts a top plan view of the URGFB of FIG. 2. FIG. 5 depicts a side elevation view of the URGFB of FIG. 2. FIG. 6 depicts a bottom plan view of the URGFB of FIG. 2. In the depicted example, the URGFB 101 is unitarily formed with an annular torque transmitter (ring gear 105, as depicted) and a surface mount (flange 110, as depicted). As depicted, the flange is provided with a plurality of apertures 115. The apertures 115 may, for example, provide for passage of fasteners (e.g., bolts, screws, rivets, welds) therethrough to mount the URGFB 101 to a surface.

In some embodiments, such as depicted, the ring gear 105 may be sized to fit within an inner diameter of the flange 110. In some embodiments, the ring gear 105 may be configured to mounted about an exterior diameter of the flange 110.

The flange 110 and the ring gear 105 may be unitarily formed by, for example, welding the ring gear 105 to the flange 110. The ring gear 105 and the flange 110 may, by way of example and not limitation, be welded in an alternating pattern (e.g., by a robotic welding machine) to prevent a base metal temperature from exceeding a predetermined threshold. The ring gear 105 and the flange 110 may, by way of example and not limitation, be inertial welded (e.g., spin welded). Accordingly, the ring gear 105 and flange 110 may be advantageously formed as a unitary body.

In various embodiments, assembly time may be advantageously reduced. In various embodiments, various hardware may be reduced such as, by way of example and not limitation: fixturing hardware (e.g., alignment pins and/or springs) may be eliminated, mounting hardware between the annular torque transmitter and the surface mount may be eliminated, or some combination thereof. In various embodiments additional material for a mounting surface (e.g., a second mounting flange) of the surface mount to receive the annular torque transmitter may be eliminated. In various embodiments weight may be reduced (e.g., by elimination of hardware and/or material). For example, in an illustrative test, weight of an assembly was reduced by approximately 14%. In an illustrative test, by way of example and not limitation, approximately 30 minutes of assembly time was eliminated. In various embodiments additional coating steps (e.g., chemical agent resistant coating (CARC) of the surface mount prior to assembly of the ring gear thereto), additional treatment steps (e.g., thermal treating, hardening), or some combination thereof, may be eliminated. Accordingly, various embodiments may advantageously reduce weight, reduce component counts, increase manufacturing speed, lower cost (e.g., by reducing labor time, coatings, operations, material, and/or components), or some combination thereof. In various embodiments, unitary body construction may, by way of example and not limitation, increase structural stability (e.g., by evenly distributing stresses), reduce failure points (e.g., by reducing or eliminating opportunity for crevice corrosion and/or galvanic corrosion between the annular torque transmitter and the surface mount), or some combination thereof.

Figure 7A:
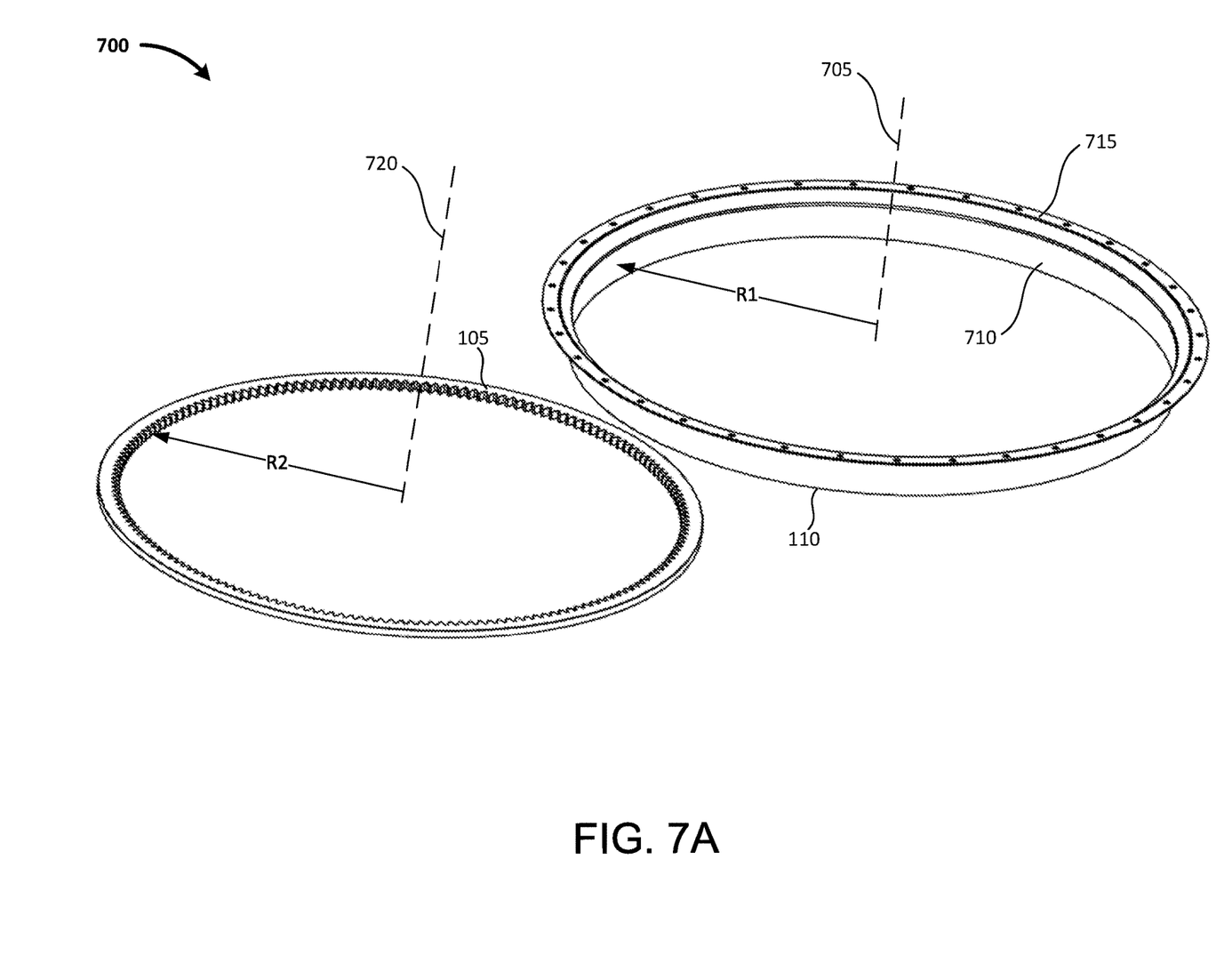
FIG. 7A depicts an exemplary ring gear and flange before forming into a unitary body.
Figure 7B:
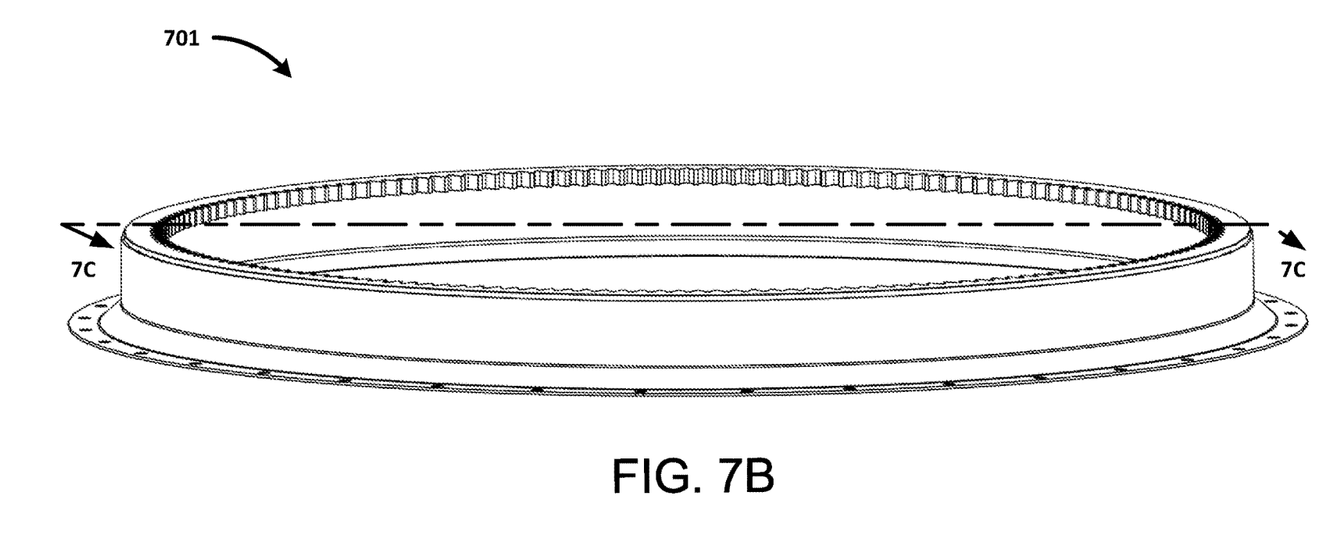
FIG. 7B depicts the exemplary ring gear and flange of FIG. 7A positioned in preparation for forming into a unitary body.
Figure 7C:
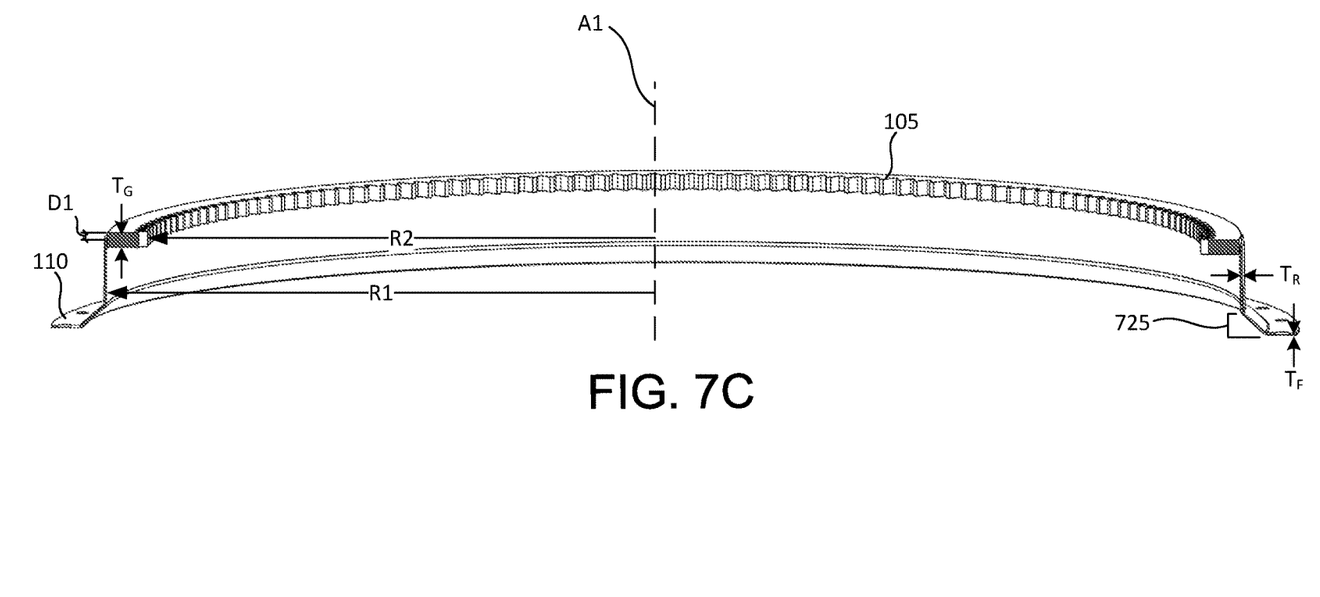
FIG. 7C depicts a cross-sectional view of the exemplary ring gear and flange of FIG. 7B.
Figure 7D:
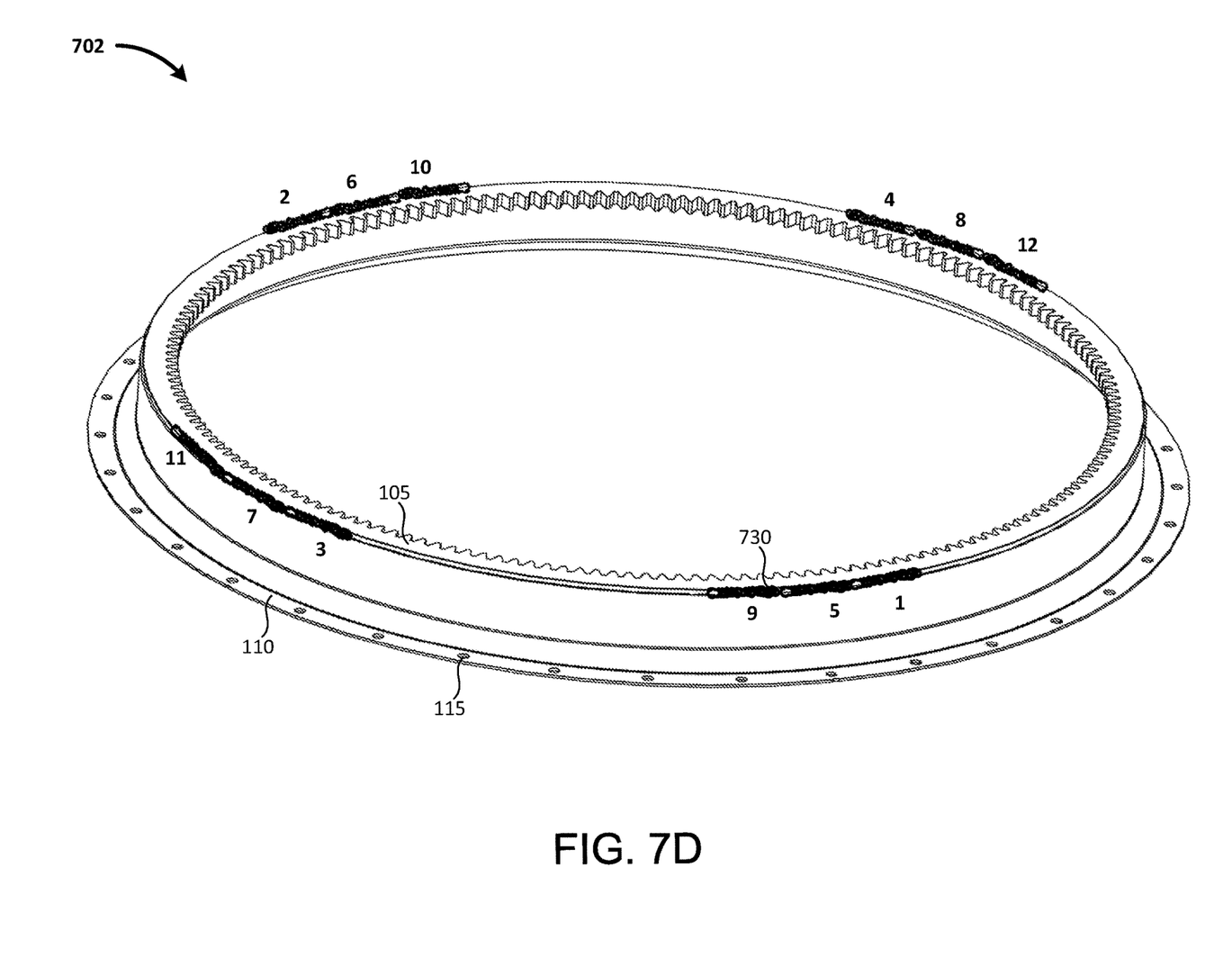
FIG. 7D depicts the exemplary ring gear and flange of FIG. 7A partially formed into a URGFB.

FIG. 7A depicts an exemplary ring gear and flange before forming into a unitary body. FIG. 7B depicts the exemplary ring gear and flange of FIG. 7A positioned in preparation for forming into a unitary body. FIG. 7C depicts a cross-sectional view of the exemplary ring gear and flange of FIG. 7B. FIG. 7D depicts the exemplary ring gear and flange of FIG. 7A partially formed into a URGFB.

In a depicted preparation scenario 700, the flange 110 and the ring gear 105 may be provided as individual units. The flange 110 may be formed from a single base material. For example, the flange 110 may be spin formed. The flange 110 has an axis of revolution 705 and has an inner radius R1. The flange 110, as depicted, has a riser body 710 and a flange 715. In the depicted example, the riser body 710 and the flange 715 are formed of a continuous material (e.g., from a single material blank such as blank 109).

The ring gear 105 has an axis of revolution 720 and has an inner radius R2. The ring gear 105 may, for example, be machined. In some embodiments, the ring gear 105 may be forged. The ring gear 105 may, for example, be (subsequently) treated (e.g., heat-treated and/or cryo-treated) to achieve desired mechanical properties (e.g., hardness, wear-resistance).

In a depicted assembly scenario 701, the ring gear 105 and the flange 110 may be assembled into a (predetermined) geometric relationship. In the depicted example, the ring gear 105 is positioned such that the axis of revolution 720 of the ring gear 105 and the axis of revolution 705 of the flange 110 are aligned with a longitudinal axis A1. An upper surface of the ring gear 105 is aligned with an offset of D1 relative to an upper edge of the flange 110. In some embodiments, D1 may be zero. In some embodiments, D1 is configured as a function of a dimension (e.g., based on thickness) of a planned weld (bead). For example, in some embodiments, an (at least partially) autogenous weld may be formed. The D1 may be configured to prevent a 'crater' due to flowing of the ring gear 105 into the weld.

In some embodiments, D1 may be negative, for example. As an illustrative example, the upper edge of the riser body 710 may be proud of the upper surface of the ring gear 105. The proud edge may, for example, be cutoff. The proud edge may, for example, serve as filler metal for welding.

In some embodiments, an orientation feature (e.g., a lip) may be formed. For example, an upper edge of the riser body 710 may be formed into a lip. In some embodiments, a lip may protrude from the riser body 710 (e.g., substantially orthogonal to the axis of revolution 705). The orientation feature may, for example, advantageously provide a 'stop' to register the ring gear 105 with the flange 110 in a (predetermined) orientation during assembly.

The riser body 710 has a thickness $T_R$. The flange 715 has a thickness $T_F$. The $T_R$ and the $T_F$ may, by way of example and not limitation, be substantially equal. As an illustrative example, the $T_R$ and/or the $T_F$ may, by way of example and not limitation, be less than about 0.1 inches.

The ring gear 105 has a thickness $T_G$. In the depicted example, $T_G>T_F$. In the depicted example, $T_G>T_R$. As an illustrative example, the $T_G$ may be at least about 0.5 inches.

In some embodiments, by way of example and not limitation, a ratio of $T_G:T_F$ and/or $T_G:T_R$ may be at least about 5:1. Accordingly, some embodiments may advantageously enable a unitary body to be (cost-effectively and/or rapidly) manufacturing having a flange significantly thinner than a corresponding ring gear. Such embodiments may, for example, advantageously provide a lighter weight assembly (e.g., vs casting, machining, and/or forging a unitary body).

In the depicted example, the flange 110 is (spin-)formed with a transition region 725. The transition region 725 has an increasing diameter (e.g., monotonically increasing, linearly increasing as depicted) with respect to increasing distance along the axis of revolution 705 from the riser body 710 to the flange 715. Such an embodiment may, for example, advantageously reduce stress concentration in the flange 110 in the transition from the riser body 710 to the flange 715 (e.g., vs a sharp bend). The transition region 725 may, for example, advantageously provide clearance inside the URGFB 101 (e.g., to clear features of machinery when mounting the URGFB 101 via the flange 715).

In a depicted unifying scenario 702, one or more weld beads 730 are formed joining the ring gear 105 to the flange 110. In the depicted example, the one or more weld beads 730 are formed in an alternating pattern (e.g., as depicted by the sequential numbering of the weld beads 730). In some embodiments, a continuous bead may be formed. In some embodiments, the ring gear 105 and the flange 110 may be formed, for example, by spin-welding. In some embodiments, the ring gear 105 and the flange 110 may be adhered together (e.g., by an adhesive, epoxy).

Figure 8:
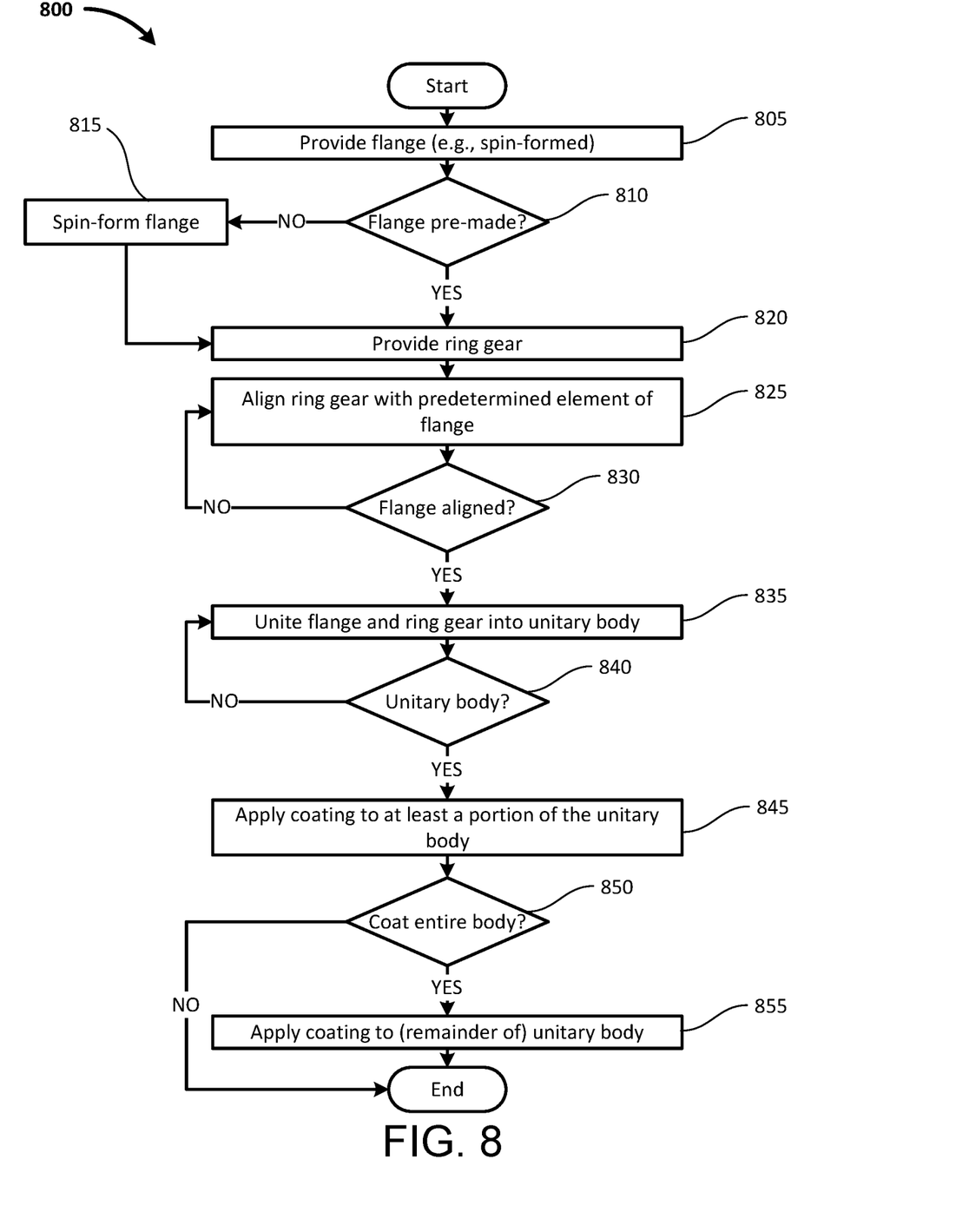
FIG. 8 depicts an exemplary method of manufacturing a URGFB such as disclosed at least with reference to FIGS. 1-7C.

FIG. 8 depicts an exemplary method of manufacturing a URGFB such as disclosed at least with reference to FIGS. 1-7C. In a method 800, a flange (e.g., a spin-formed flange-body such as flange 110) is provided in a step 805. In a decision point 810, if the flange is not pre-made, then the flange is spin-formed in a step 815. For example, the flange may be spin-formed using a spoon (e.g., manual, automatic). The flange may, for example, be spin-formed using a mandrel and/or shell.

Once the flange has been spin-formed in the step 815 or the flange was pre-made, then a ring gear (e.g., the ring gear 105) is provided in a step 820. The ring gear is aligned with a predetermined element of the flange in a step 825 (e.g., such as disclosed at least with reference. to FIGS. 7A-7C). If the flange is determined, in a decision point 830, to not be aligned, the method 800 returns to the step 825. If the flange is determined to be aligned, in the decision point 830, then the flange and the ring gear are united into a unitary body in a step 835. For example, the 835//may include welding (e.g., such as disclosed at least with reference to FIGS. 1, 7D).

If it is determined that the flange and ring gear are not (yet) a unitary body, in a decision point 840, then the method 800 returns to the step 835. Once it is determined, in the decision point 840, that the flange and ring gear are a unitary body, then a coating(s) is applied to at least a portion of the unitary body in a step 845. If it determined, in a decision point 850, that the entire unitary body is to be coated and is not yet coated, then coating is (continued to be) applied to (a remainder of) the unitary body in a step 855. Once the unitary body is completed coated in the step 855 or it is determined in the decision point 850 that the entire body is not to be coated, then the method ends.

Although various embodiments have been described with reference to the figures, other embodiments are possible. For example, in various embodiments a surface mount and an annular torque-transmitter may be individually constructed, treated, and/or coated before forming into a single unitary body. In various embodiments the annular torque transmitter and the surface mount may be formed into a single unitary body by welding. For example, the annular torque transmitter may be welded around at least one edge of the surface mount where it comes in contact with the surface mount. The surface mount may, for example, have a height configured to position the annular torque transmitter at a desired vertical position when inserted inside the surface mount and formed unitarily therewith. In various embodiments, the annular torque transmitter and the surface mount may be unitarily formed using a circular pattern of interrupted weld beads. In some embodiments, the annular torque transmitter and the surface mount may be unitarily formed by at least one continuous weld bead.

In various embodiments, the annular torque transmitter and the surface mount may be unitarily formed by inertial welding wherein the annular torque transmitter and the surface mount are fixtured concentric to one another and at least one is spun at a predetermined speed while they are advanced towards each other such that they are forced together while rotating relative to one another. The annular torque transmitter and the surface mount may, for example, be dimensioned to provide a sufficient amount of material for material loss during inertial welding. By way of example and not limitation, deflashing operation(s), heat treatment operations, and/or coating operations may be performed after inertial welding. In various embodiments inertial welding may be performed before and/or after machining of drive features (e.g., teeth) in the annular torque transmitter. In various embodiments inertial welding may be performed before and/or after heat treatment of the angular torque transmitter.

In various embodiments the surface mount may be configured as a flange suitable for fastening onto one or more surfaces. For example, the flange may be configured to couple the annular torque transmitter to the surface of a bearing. In various embodiments, such as are shown in FIGS. 1-F, the URGFB may be configured to drive a turret, illustrative examples of which are described in U.S. patent application Ser. Nos. 12/751,254; 13/895,787; 14/722,819; 15/055,384; 15/704,910; 16/226,264; and Ser. No. 16/993,421, which are incorporated herein by reference in their entirety.

In various embodiments the annular torque transmitter may be configured for large applications (e.g., substantially 38 inches in diameter), for small applications (e.g., as a micro-gear less than 1 inch in diameter), for other sizes greater then, less than, or within the exemplary range, or some combination thereof. In various embodiments the annular torque transmitter may be configured, by way of example and not limitation, as a gear (e.g., as shown in FIGS. 1-7F with involute teeth as drive members), as a sheave and/or pulley with patterned drive members (e.g., circumferentially and/or radially spaced features to engage a belt), as a sprocket (e.g., with teeth configured to engage a chain), or some combination thereof. In various embodiments drive members of the annular torque transmitter may be facing radially inward (e.g., as shown in FIGS. 1-7F) towards an axis of rotation of the UTTSMB, radially outward from the axis of rotation, substantially parallel to the axis of rotation, or some combination thereof. In various embodiments an annular torque transmitter may be smooth or may be provided with drive members (e.g., teeth, ribs, patterned bosses and/or grooves/pockets). In various embodiments a UTTSMB may be mounted to a power source (e.g., a motor, engine, flywheel, or the like) or to a driven body (e.g., where the UTTSMB is configured to receive power from a power source and transmit it to the driven body). In various embodiments an annular torque transmitter may be configured to be driven by one or more belts, chains, gears, or some combination thereof.

For example, in some embodiments the annular torque transmitter may be configured as a ring gear unitarily formed on an outer surface of the surface mount. For example, the ring gear 105 (with teeth facing radially inward) of the URGFB depicted in FIGS. 1-7F may be replaced with a ring gear wherein the teeth are facing radially outward in having an annular center aperture configured to fit over (vs. inside of as ring gear 105) the flange 110. Accordingly, the outward facing ring gear 105 may, for example, advantageously be engaged by an outer-mounted drive member (e.g., a motor-driven gear).

A coating may, for example, be sprayed on. A coating may, for example, be applied by immersion. The coating may, for example, be applied by electro-coating. A coating may, for example, include galvanization. The coating may, for example, include a multi-part coating. In some embodiments, by way of example and not limitation, multiple layers may be applied. In some embodiments, by way of example and not limitation, different coatings may be applied to different portions. In some embodiments having different coatings on different portions, for example, the coatings may be configured to interface to create a substantially continuous coating over an entire exterior and/or exposed surface(s) of the unitary body.

Although an exemplary system has been described with reference to the figures, other implementations may be deployed in other industrial, scientific, medical, commercial, and/or residential applications. Various embodiments may advantageously implement one or more UTTSMBs in various configurations. For example, a rock tumbler (such as, for example, is used in gold mining to perform progressive screening) may be advantageously provided with a UTTSMB to drive a tumbler container. For example, the UTTSMB may be mounted directly to the tumbler container.

In various embodiments washing machines may, for example, be advantageously fitted with a UTTSMB. For example, a URGFB (e.g., as shown in FIGS. 1-7F) may be mounted directly to a (rear of a) washing machine drum. The URGFB may, for example, be driven by an electric motor (e.g., engaging inner, outer, or facial teeth of the ring gear). In some such embodiments the annular torque transmitter may, by way of example and not limitation, include a pulley (e.g., smooth faced such as to engage a V-belt. The annular torque transmitter may, for example, have drive members configured to engage a longitudinally and/or transversely grooved drive belt such as a transversely grooved timing belt). In various embodiments the washing machine may be a front-load washer. Accordingly, the washing machine drum may advantageously omit a shaft whereby the drum must be driven and supported, and which is a common failure point (e.g., bending of the shaft and/or rear surface of the drum where the shaft attaches). Accordingly, in various embodiments a UTTSMB may provide for a more robust, and/or higher capacity front-loading washing machine.

In various embodiments a rotating container (e.g., a portable, vehicular, and/or stationary aggregate mixer) may be provided with a UTTSMB. The UTTSMB may be mounted to an end of the concrete receptacle and be driven by, for example, a motor (e.g., by a belt, chain, and/or gear). Accordingly, the UTTSMB may advantageously allow the container to be directly driven by a power source without the use of a shaft or forming of a torque transmitter directly into the container itself. For example, in various embodiments a UTTSMB may be releasably coupled such that the UTTSMB readily replaceable (e.g., by replacing bolts). For example, in various such embodiments if the UTTSMB is broken (e.g., teeth broken on the annular torque transmitter), the UTTSMB may be readily removed and replaced. In various embodiments the UTTSMB may be permanently coupled to a target surface.

In various embodiments, a UTTSMB may, by way of example and not limitation, be mounted to any rotating and/or rotatable body. In various embodiments the body may, for example, be generally cylindrical. Various embodiments may, for example, advantageously allow driving an open cylinder (e.g., at a 'mouth' end), thereby obviating the need for a shaft. Various embodiments may advantageously provide for a desired clearance height by providing a surface mount (e.g., a flange) instead of requiring the annular torque transmitter (e.g., ring gear) to be mounted directly to the rotating body.

Apparatus and associated methods relate to unitary annular torque-transmitter-surface mount bodies (UTTSMB). In an illustrative example, the annular torque-transmitter may be a ring gear and the surface mount may be a flange. The ring gear and flange may, for example, be formed into a boltless unitary ring gear—flange body (URGFB) with no hardware coupling the ring gear and flange. The flange may, for example, be configured to mount to a surface of a rotating power source and/or a rotatable driven body. Various embodiments may advantageously provide cost-effective surface-mounted torque transmission.

In some embodiments, the ring gear 105 and the flange 110 may, by way of example and not limitation, be formed from a single base material. The flange 110 may, for example, be formed with an outer lip (e.g., having the apertures 115) and an inner lip. The inner lip and/or the outer lip may, for example, be subsequently machined to form the tooth profiles (e.g., involute) of the ring gear 105.

In an illustrative aspect, a method of manufacturing a unitary ring gear-flange body may include spin-forming a continuous flange body. The continuous flange body may be spin-formed to include a riser body extending substantially parallel to a longitudinal axis. The continuous flange body may be spin-formed to include a flange extending substantially radially outward from the riser body. The method may include welding to the riser body a ring gear to form a unitary assembly. The ring gear may have an axis of revolution aligned with the longitudinal axis. The method may include applying a continuous, corrosion-resistant coating to substantially an entire exposed surface of the unitary assembly.

Spin-forming the continuous flange body may include forming at least the riser body such that a radius of the continuous flange body monotonically increases along longitudinal axis along at least a portion of the riser body adjacent to the flange. The radius may be an inner radius such that a cross-sectional area of an interior of the continuous flange body monotonically increases along the longitudinal axis along the at least a portion of the riser body adjacent to the flange.

Spin-forming the continuous flange body may include forming the continuous flange body out of a single piece of material.

The method may include machining the ring gear.

Figure 9:
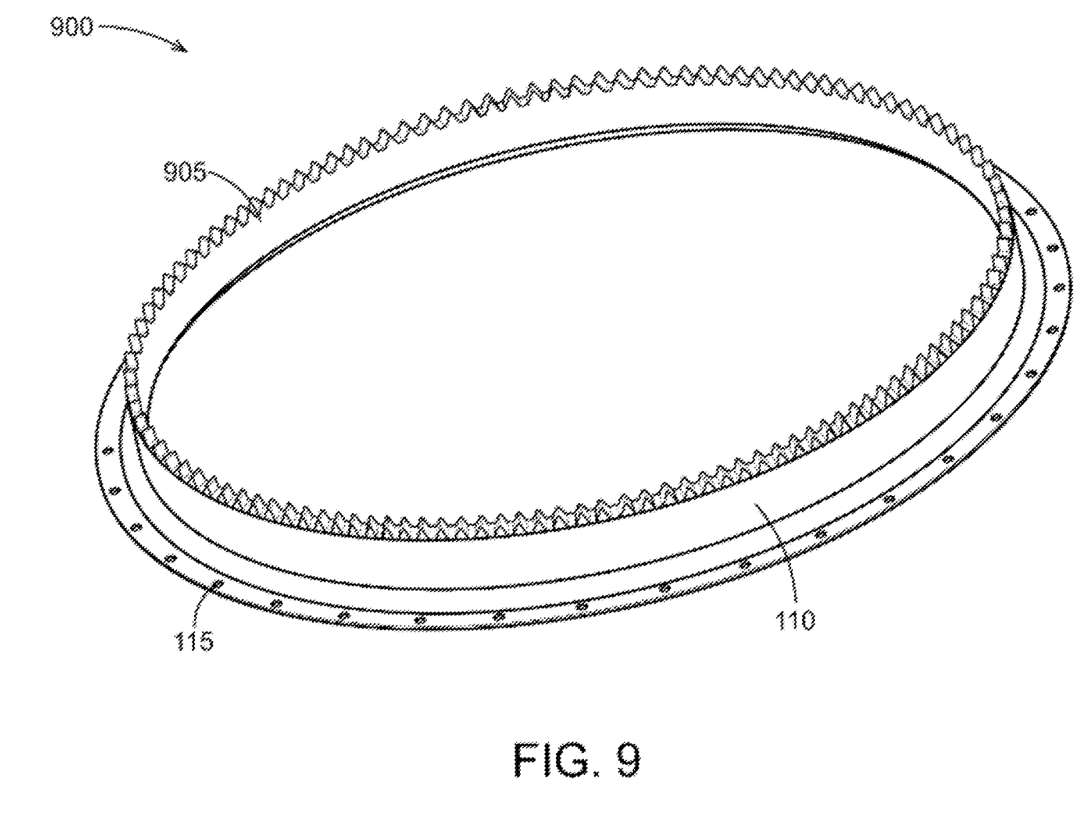
FIG. 9 depicts a perspective view of an exemplary URGFB.

The ring gear may be assembled such that teeth of the ring gear extend substantially orthogonal to the longitudinal axis. FIG. 9 depicts a perspective view of an exemplary URGFB 900. The ring gear may be assembled such that teeth 905 of the ring gear extend substantially parallel to the longitudinal axis.

In an illustrative aspect, a method of manufacturing a unitary ring gear-flange body may include spin-forming a continuous flange body. The continuous flange body may be spin-formed to include a riser body extending substantially parallel to a longitudinal axis. The continuous flange body may be spin-formed to include a flange extending substantially radially outward from the riser body. The method may include welding to the riser body a ring gear to form a unitary assembly. The ring gear may have an axis of revolution aligned with the longitudinal axis. The method may include applying a continuous coating to at least a selected portion of a surface of the unitary assembly.

The selected portion of the surface may include substantially an entire exterior surface of the unitary assembly. The continuous coating may form a continuous corrosion-resistant boundary layer configured to inhibit access of corrosive agents to underlying crevices in the unitary assembly.

Spin-forming the continuous flange body may include forming at least the riser body such that a radius of the continuous flange body monotonically increases along longitudinal axis along at least a portion of the riser body adjacent to the flange. The radius may be an inner radius such that a cross-sectional area of an interior of the continuous flange body monotonically increases along the longitudinal axis along the at least a portion of the riser body adjacent to the flange.

Spin-forming the continuous flange body may include forming the continuous flange body out of a single piece of material.

The thickness of the ring gear may be at least two times greater than a thickness of the riser body. The thickness of the ring gear may be at least three times greater than a thickness of the riser body. The thickness of the ring gear may be at least four times greater than a thickness of the riser body. The thickness of the ring gear may be at least five times greater than a thickness of the riser body. The thickness of the ring gear may be more than five times greater than a thickness of the riser body.

The method may include machining the ring gear.

The ring gear may be assembled such that teeth of the ring gear extend substantially orthogonal to the longitudinal axis. The ring gear may be assembled such that teeth of the ring gear extend substantially parallel to the longitudinal axis.

Welding to the riser body the ring gear may include creating a plurality of welds joining the riser body to the ring gear in an alternating pattern.

At least one of the continuous flange body and the ring gear may include metal.

In an illustrative aspect, a unitary ring gear-flange body may include a spun-form continuous flange body. The continuous flange body may include a riser body extending substantially parallel to a longitudinal axis. The continuous flange body may include a flange extending substantially radially outward from the riser body. The unitary ring gear-flange body may include a ring gear welded to the riser body to form a unitary assembly, the ring gear having an axis of revolution aligned with the longitudinal axis. The unitary ring gear-flange body may include a continuous coating covering at least a selected portion of a surface of the unitary assembly.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A method of manufacturing a unitary ring gear-flange body, the method comprising:
spin-forming a continuous flange body to comprise:
a riser body extending parallel to a longitudinal axis; and,
a flange extending radially outward from the riser body;
preparing a hardened ring gear by a process comprising at least one of: heat treatment and cryo treatment;
welding to the riser body the hardened ring gear to form a unitary assembly, the ring gear having an axis of revolution aligned with the longitudinal axis, the welding being performed on a single side of the ring gear; and,
applying a continuous, corrosion-resistant coating to an entire exposed surface of the unitary assembly.

2. The method of claim 1, wherein spin-forming the continuous flange body comprises forming at least the riser body such that a radius of the continuous flange body monotonically increases along longitudinal axis along at least a portion of the riser body adjacent to the flange.

3. The method of claim 2, wherein the radius is an inner radius such that a cross-sectional area of an interior of the continuous flange body monotonically increases along the longitudinal axis along the at least a portion of the riser body adjacent to the flange.

4. The method of claim 1, wherein spin-forming the continuous flange body comprises forming the continuous flange body out of a single piece of material.

5. The method of claim 1, further comprising machining the ring gear.

6. The method of claim 1, wherein the ring gear is assembled such that teeth of the ring gear extend orthogonal to the longitudinal axis.

7. The method of claim 1, wherein the ring gear is assembled such that teeth of the ring gear extend parallel to the longitudinal axis.

8. The method of claim 1, wherein the welding is performed in an interrupted pattern on the single side of the ring gear.

9. A method of manufacturing a unitary ring gear-flange body, the method comprising:
spin-forming a continuous flange body to comprise:
a riser body extending parallel to a longitudinal axis; and,
a flange extending radially outward from the riser body;
preparing a hardened ring gear by a process comprising at least one of:
heat treatment and cryo treatment;
welding to the riser body the hardened ring gear to form a unitary assembly, the ring gear having an axis of revolution aligned with the longitudinal axis, the welding being performed on a single side of the ring gear; and,
applying a continuous coating to at least a selected portion of a surface of the unitary assembly.

10. The method of claim 9, wherein spin-forming the continuous flange body comprises forming at least the riser body such that a radius of the continuous flange body monotonically increases along longitudinal axis along at least a portion of the riser body adjacent to the flange.

11. The method of claim 10, wherein the radius is an inner radius such that a cross-sectional area of an interior of the continuous flange body monotonically increases along the longitudinal axis along the at least a portion of the riser body adjacent to the flange.

12. The method of claim 9, wherein the selected portion of the surface comprises an entire exterior surface of the unitary assembly.

13. The method of claim 9, wherein the continuous coating forms a continuous corrosion-resistant boundary layer configured to inhibit access of corrosive agents to underlying crevices in the unitary assembly.

14. The method of claim 9, wherein spin-forming the continuous flange body comprises forming the continuous flange body out of a single piece of material.

15. The method of claim 9, wherein a thickness of the ring gear is at least five times greater than a thickness of the riser body.

16. The method of claim 9, further comprising machining the ring gear.

17. The method of claim 9, wherein the ring gear is assembled such that teeth of the ring gear extend orthogonal to the longitudinal axis.

18. The method of claim 9, wherein the ring gear is assembled such that teeth of the ring gear extend parallel to the longitudinal axis.

19. The method of claim 9, wherein welding to the riser body the ring gear comprises creating a plurality of welds joining the riser body to the ring gear in an alternating pattern.

20. The method of claim 9, wherein at least one of the continuous flange body and the ring gear comprise metal.

21. The method of claim 9, wherein the welding is performed in an interrupted pattern on the single side of the ring gear.

* * * * *